United States Patent
Harvey et al.

(10) Patent No.: US 9,003,129 B1
(45) Date of Patent: Apr. 7, 2015

(54) TECHNIQUES FOR INTER-STORAGE-PROCESSOR CACHE COMMUNICATION USING TOKENS

(75) Inventors: David W. Harvey, Newton, MA (US); Henry Austin Spang, IV, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 421 days.

(21) Appl. No.: 13/435,917

(22) Filed: Mar. 30, 2012

(51) Int. Cl.
G06F 12/00 (2006.01)
G06F 13/00 (2006.01)
G06F 13/28 (2006.01)
G06F 12/08 (2006.01)

(52) U.S. Cl.
CPC ........ G06F 12/0831 (2013.01); G06F 12/0817 (2013.01)

(58) Field of Classification Search
CPC ............ G06F 12/0815; G06F 12/0826; G06F 12/0817; G06F 12/0831
USPC .................................................. 711/141, 119
See application file for complete search history.

(56) References Cited

U.S. PATENT DOCUMENTS

| | | | |
|---|---|---|---|
| 5,761,705 A * | 6/1998 | DeKoning et al. ............ | 711/113 |
| 6,449,695 B1 * | 9/2002 | Bereznyi et al. .............. | 711/134 |
| 6,981,097 B2 * | 12/2005 | Martin et al. ................. | 711/130 |
| 7,293,198 B2 | 11/2007 | Burroughs et al. | |
| 7,809,975 B2 | 10/2010 | French et al. | |
| 7,849,350 B2 | 12/2010 | French et al. | |
| 2013/0191529 A1 | 7/2013 | Sugaya | |

OTHER PUBLICATIONS

Michael R. Marty and Mark D. Hill, "Coherence Ordering for Ring-based Chip Multiprocessors", 2006.*
Milo M.K. Martin, "Token Coherence", 2003, University of Wisconsin-Madison.*
Harvey, U.S. Appl. No. 13/332,563, filed Dec. 21, 2011.

* cited by examiner

*Primary Examiner* — Matthew Bradley
*Assistant Examiner* — Rocio Del Mar Perez-Velez
(74) *Attorney, Agent, or Firm* — BainwoodHuang

(57) ABSTRACT

A method, performed at a first storage processor (SP) connected to a mirroring second SP, includes (a) receiving a write command at the first SP from a host directed to a particular address of a data storage array, (b) identifying a reference in a first cache that is uniquely associated with the particular address, the reference having a token count field, (c) determining whether the reference is synchronized with a corresponding reference in a second cache, and (d) if the reference is synchronized with the corresponding reference, then (1) performing a cache write operation on a cache page pointed to by the reference if the reference stores a maximum token count value and (2) otherwise, sending a token request message from the first SP to the second SP over a cache mirroring bus to request a token from the second SP prior to performing the cache write operation.

17 Claims, 5 Drawing Sheets

US 9,003,129 B1

TECHNIQUES FOR INTER-STORAGE-PROCESSOR CACHE COMMUNICATION USING TOKENS

BACKGROUND

Data storage arrays are used to provide large amounts (e.g., 10 terabytes to 10 petabytes) of data storage to enterprises. An example of such a data storage array is a VNX® brand array produced by the EMC Corp. of Hopkinton, Mass. Storage commands are sent by a host computer also connected to the storage network to a storage processor of the data storage array. A typical data storage array typically has two storage processors to allow for load balancing and high availability.

In some systems, each storage processor contains a cache configured as a write-back cache in order to speed performance. In order to increase reliability, many systems enable cache mirroring between the caches of two storage processors, so that cache writes are normally not confirmed until stored in both caches. These systems typically operate in an active/passive configuration, in which one storage processor is regarded as the active storage processor for certain areas of storage, while the other storage processor is regarded as the passive storage processor for those areas, the passive storage processor serving primarily as a backup for the certain areas of storage.

SUMMARY

Although the above-described conventional systems provide beneficial functionality, it is sometimes desirable to configure mirrored caching storage processors in an active/active configuration to allow for path indifference. Although this can be done if a large number of messages are exchanged between the storage processors, it would be preferable to configure mirrored caching storage processors in an active/active configuration using a minimal number of messages exchanged between the storage processors.

Therefore, the present disclosure provides techniques for configuring mirrored caching storage processors in an active/active configuration using tokens associated with reference structures.

In one embodiment, a method performed at a first storage processing device (SP) is disclosed. The first SP has a first cache. The first SP is communicatively connected to a second SP having a second cache over a cache mirroring bus. The first cache and the second cache are configured to function as mirrors, and the first SP and the second SP are configured to operate in an active/active fashion for processing data storage commands directed at a data storage array. The method includes (a) receiving a write command at the first SP from a host computer directed to a particular address of the data storage array, (b) identifying a reference structure in the first cache that is uniquely associated with the particular address, the reference structure pointing to a set of cache pages associated with the particular address, the reference structure having a token count field, (c) determining whether the reference structure is synchronized with a corresponding reference structure in the second cache, and (d) if the reference structure is synchronized with the corresponding reference structure, then (1) performing a cache write operation on a cache page of the set of cache pages pointed to by the reference structure if the reference structure stores a maximum token count value and (2) otherwise, sending a token request message from the first SP to the second SP over the cache mirroring bus to request a token from the second SP prior to performing the cache write operation. A corresponding apparatus is also disclosed.

In another embodiment, a method performed at a first storage processing device (SP) is disclosed. The first SP has a first cache. The first SP is communicatively connected to a second SP having a second cache over a cache mirroring bus. The first cache and the second cache are configured to function as mirrors, and the first SP and the second SP are configured to operate in an active/active fashion for processing data storage commands directed at a data storage array. The method includes (a) receiving a read command at the first SP from a host computer directed to a particular address of the data storage array, (b) identifying a reference structure in the first cache that is uniquely associated with the particular address, the reference structure pointing to a set of cache pages associated with the particular address, the reference structure having a token count field, (c) determining whether the reference structure is synchronized with a corresponding reference structure in the second cache, and (d) if the reference structure is synchronized with the corresponding reference structure, then (1) performing a cache read operation on a cache page of the set of cache pages pointed to by the reference structure if the reference structure stores a token count value of at least one and (2) otherwise, sending a token request message from the first SP to the second SP over the cache mirroring bus to request a token from the second SP prior to performing the cache read operation. A corresponding apparatus is also disclosed.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Therefore, the present disclosure provides techniques for configuring mirrored caching storage processors in an active/active configuration using tokens associated with reference structures.

Figure 1:
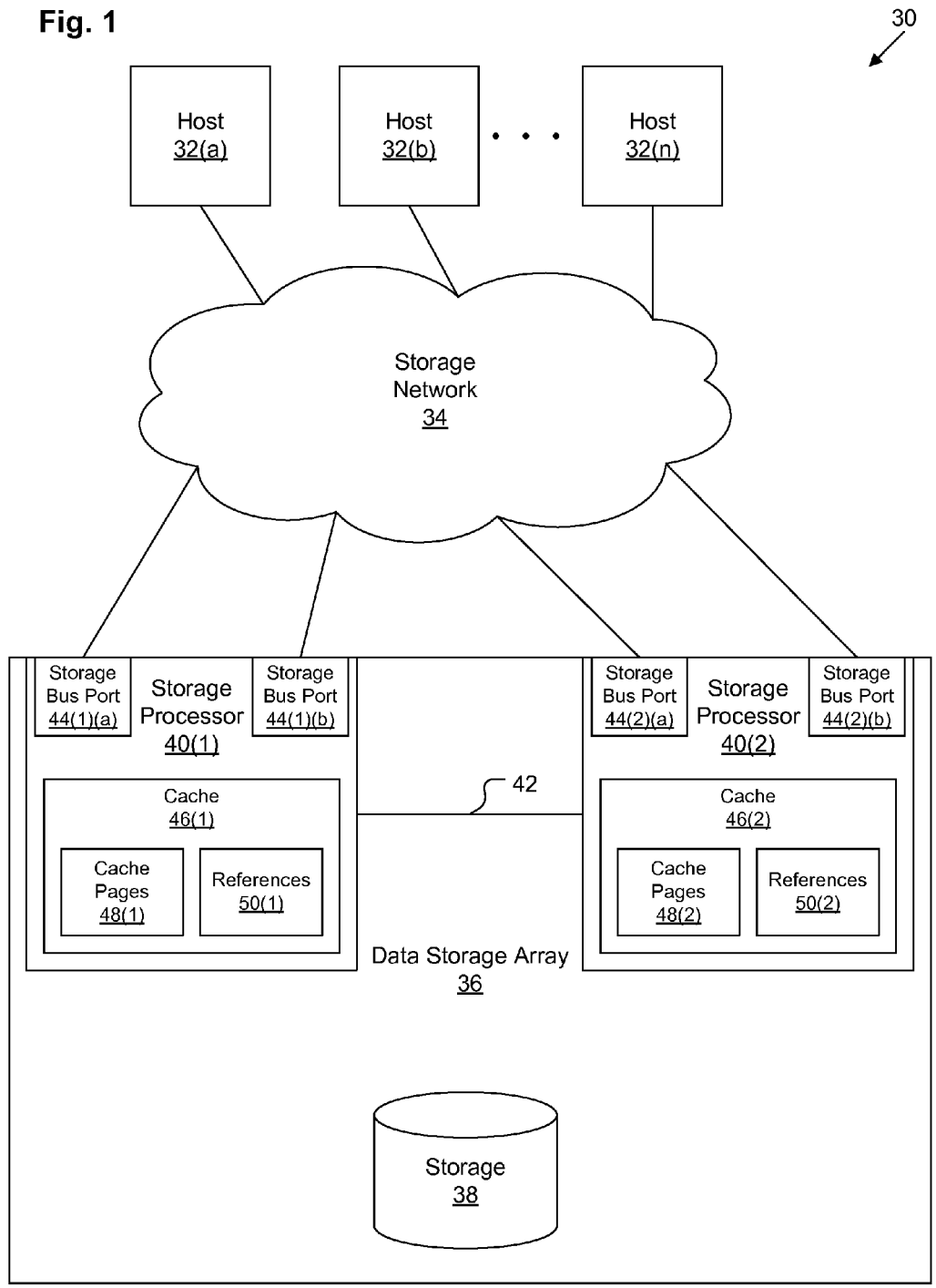
FIG. 1 illustrates an example system for use in practicing various embodiments.

FIG. 1 depicts an example system 30 for use in conjunction with various embodiments. System 30 includes a set of host machines 32(a), 32(b), . . . , 32(n). Hosts 32 may be any kind of computerized device capable of processing data storage commands, such as, for example, a personal computer, a workstation, a server computer, an enterprise server computer, a desktop computer, a laptop computer, etc. Hosts 32 connect to a data storage array 36 over storage network 34. Storage network 34 is used to transmit data storage commands and associated data. Storage network 34 may be for example, a storage area network (SAN), a local area network (LAN), a wide area network (WAN), a fabric of connections and switches, etc. It may be based on Ethernet, Fibre Channel, etc.

Data storage array 36 includes storage 38 and storage processors (SPs) 40. Storage 38 is a form of non-volatile memory for storing files and data. Storage 38 may include a plurality of data storage devices (e.g., hard disks, solid state drives, etc.) arranged in an array configuration and controlled by one or more storage processors. SPs 40 are devices which receive data storage commands from a host 32 and cause the commands to be performed on storage 38. A typical data storage array 36 has two SPs 40(1), 40(2), each of which typically has two storage bus ports 44, which physically connect to storage network 34, although it should be understood that other numbers of SPs 40 and storage bus ports 44 are also possible.

It should be understood that each host 32 may have multiple paths for data storage operations to be sent to data storage array 36. A path is a pairing between a particular host bus port of a host 32 and a particular storage bus port 44. These paths may be logical, or they may be physical, based on switched connections of a fabric of connections and switches. Having multiple paths between the host 32 and the data storage array 36 may be useful for load-balancing. The availability of multiple paths may also be useful in case one or more of the various ports goes off-line, or if a connection gets cut, in which case storage operations can be re-routed over a different path.

Each SP 40 also includes a cache 46, which contains cache pages 48, which store cached data associated with storage commands, as well as references, which are structures that store information regarding the cache pages 48. Data storage array 36 also includes an interprocessor bus or cache mirroring bus 42, which connects the SPs 40 to allow for mirrored data and mirroring coordination signals to pass between the SPs 40.

Figure 2:
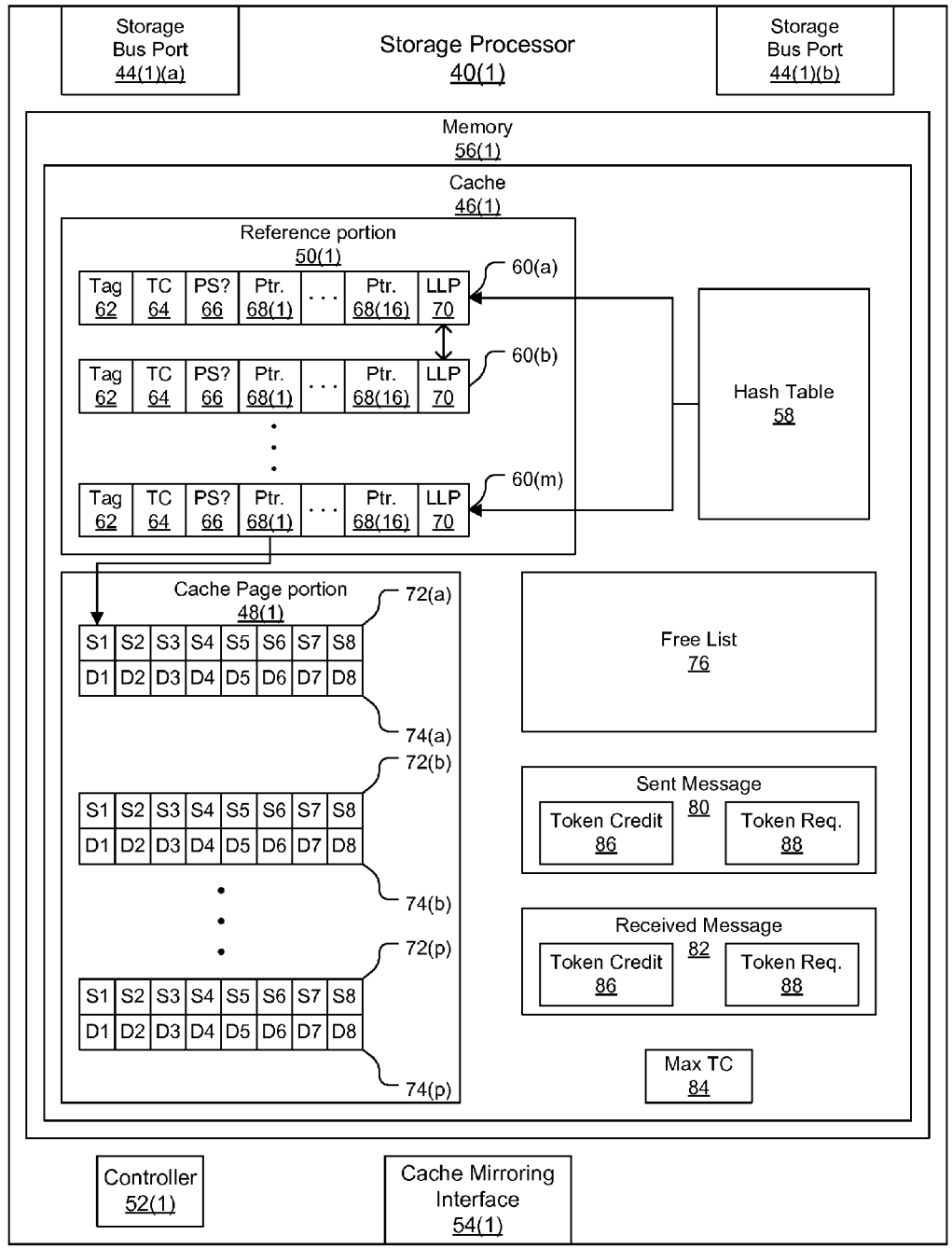
FIG. 2 illustrates an example apparatus according to various embodiments.

FIG. 2 depicts an example SP 40(1) in more detail. SP 40(1) includes a set of storage bus ports 44(1)(a), 44(1)(b), a controller 52(1), a cache mirroring interface 54(1), and memory 56(1). A typical SP 40(1) has two storage bus ports 44 which physically connect to storage network 34, although it should be understood that other numbers of storage bus ports 44 are also possible. Controller 52(1) may be, for example, a central processing unit, a microprocessor, a collection of multiple microprocessors, a digital signal processor, a field-programmable gate array, a collection of circuits configured to perform various operations, or another similar device or set of devices configured to perform operations. Cache mirroring interface 54(1) is configured to connect to the cache mirroring bus 42 to allow communication with other cache mirroring interfaces 54(x) on other SPs 40(x).

Memory 56(1) may include, for example, system memory, cache memory, volatile memory, non-volatile memory, random access memory, some combination thereof, or another similar device or set of devices configured to store running software and or data. Memory 56(1) may store executing and loaded code as well as associated data during execution by the controller 52(1), such as an operating system, drivers, and applications (not depicted). Memory 56(1) also stores cache 46(1).

Cache 46(1) includes reference portion 50(1), cache page portion 48(1), a hash table 58, a free list 76, and a maximum token count value 84. Cache 46(1) may also include one or more sent messages 80 and received messages 82. Reference portion 50(1) includes a set of reference data structures 60(a), 60(b), . . . , 60(m), while cache page portion 48(1) includes a set of cache pages 74(a), 74(b), . . . , 74(p), each of which has an associated state map 72(a), 72(b), . . . , 72(p). Each reference 60 is associated with one or two cache pages 74. Since each cache page can, in the case of small data storage operations, only store one sub-page D1-D8, In a typical configuration, enough memory 56(1) is allocated to store as many cache pages 74 as references 60 plus enough to cover transient conditions, so, for example, in one embodiment, m=1.25 p. Each reference 60 includes a tag 62, which uniquely identifies the reference 60. In some embodiments, the tag 62 is a mathematical function of an address of storage 38 represented by an associated cache page 74. For example, storage 38 may include a plurality of volumes, each having a unique logical unit number (LUN), each volume having a large number of blocks, each consecutive block being assigned a consecutive block number (BN). Thus, if cache page 74(a) stores data from LUN 7 starting at address 10,000, tag 62 of the associated reference 50, e.g., reference 60(m), may be a mathematical combination of the numbers 7 and 10,000. In some embodiments, this mathematical combination may be a concatenation of the two numbers, allocating a certain number of digits for each number, while in other embodiments, a more sophisticated mathematical combination may be used. Each reference 60 also includes a token count (TC) 64 and a peer synchronization flag (PS?) 66, which will be discussed in further detail below.

In addition, each reference 60 also includes a set of pointers 68, each of which point to sub-pages in which data is stored. For example, in one embodiment, each cache page 74 typically includes eight sub-pages, D1-D8, each of which stores 8 kilobytes of data. In some embodiments, each sub-page, D1-D8, represents a block of storage 38. In some embodiments, SP 40 is configured to cache data storage operations in chunks of up to eight consecutive blocks at a time, although it will be appreciated that some data storage operations will involve fewer than eight consecutive blocks. Thus, each cache page 74 is able to store up to 8 blocks' worth of data. A data storage operation targeted at set of 8 or fewer blocks beginning at an initial block having a BN and a LUN will be referenced by a particular reference 60(x). The pointers 68 of that reference 60(x) point to the sub-pages, associated with all of the blocks involved in the data storage operation. Thus, as depicted, if a data storage operation involves just 1 block stored in sub-page D1 of cache page 74(a), a reference 60(m) whose tag 62 is generated by the address of that block in storage 38 includes a pointer 68(1) that points to the location in memory 56(1) of sub-page D1 in cache page 74(a). In such a case, as depicted, the remaining pointers 68(2)-68(16) would be null. In another situation, not depicted, pointers 68(1)-68(8) of reference 60(m) may all point to consecutive sub-pages D1-D8 of cache page 74(a).

In some embodiments, instead of pointing to the sub-pages D1-D8 of a cache page 74, the pointers 68 actually point to sub-page state indicators S1-S8 of a state map 72, which are stored in connection with the sub-pages D1-D8. In one embodiment, each sub-page state indicator S1-S8 is a 2-bit value that represents four states, which may be referred to as Valid (V), Dirty (D), Invalid (I), or Prepared (P). If a particular sub-page D1 has a state S1 set to V, then the data contained within sub-page D1 is the same as data currently stored in the associated block in storage 38. If a particular sub-page D1 has a state S1 set to D, then the data contained within sub-page D1 represents data scheduled to be written to the associated block in storage 38, but which has not yet been written to storage 38. If a particular sub-page D1 has a state S1 set to I, then the data contained within sub-page D1 should be disregarded. If a particular sub-page D1 has a state S1 set to P, then sub-page D1 is in the middle of a page swap operation, and the data within sub-page D1 may or may not yet be correct.

In order to preserve data integrity, if a write operation is directed to a sub-page D1 of cache page 74(a) already marked D (dirty) (meaning that the data in that sub-page D1 of cache page 74(a) has not yet been written to storage 38), in order to ensure that an incomplete processing of the write operation does not result in the dirty data in sub-page D1 of cache page 74(a) becoming corrupted before being written to storage 38, a second cache page, e.g., 74(b), is allocated, so that sub-page D1 of cache page 74(b) is able to store data from the write operation. Once the data has been successfully written to sub-page D1 of cache page 74(b), sub-page state indicator S1 of cache page 74(b) can be marked D and sub-page state indicator S1 of cache page 74(a) can be marked P, since it is now prepared to acquire the new data. Then, the data from sub-page D1 of cache page 74(b) can be written to sub-page D1 of cache page 74(a), after which sub-page state indicator S1 of cache page 74(a) can be marked D and sub-page state indicator S1 of cache page 74(b) can be marked I. Thus, at any given moment, a reference 60 may have up to 16 pointers 68(1)-68(16) pointing to the up to 16 sub-pages of up to two cache pages 74. It should be understood that, in some embodiments, a write operation to a Dirty cache page 74 may be processed differently. For example, in some embodiments, the two cache pages 74(a), 74(b) may be maintained without merging Dirty sectors from 74(b) into 74(a). Thus, in one embodiment, after the new data is written to cache page 74(b), it is maintained there, and controller 52(1) is configured to ascertain which cache page 74(a), 74(b) contains the correct data for any given sub-page D1-D8.

In order to locate the appropriate reference 60(x) within reference portion 50(1) for any given storage operation, hash table 58 may be used. Thus, based on the LUN and BN of the storage operation, a tag 62 of the desired reference 60(x) may be computed by controller 52(1). Controller 52(1) may then feed the computed tag 62 into the hash table 58, which should return a pointer to a reference 60(y). Reference 60(y) may be the desired reference 60(x), or it may merely have a tag 62 that hashes to the same value as the tag 62 of reference 60(x). Thus, each reference 60 has an LLP field 70, which allows references having tags 62 with the same hash values to be traversed as a linked list.

Free list 76 includes pointers to objects, such as references 60 and cache pages 74 that are not being used, and are available for re-use. For example, if state map 72(b) stores the value I in every field and no active reference 60 contains any pointers 68 that point to any of the sub-pages D1-D8 of the associated cache page 74(b), then cache page 74(b) is no longer in active use, and a pointer to that cache page 74(b) may be stored in the free list 76, so that another reference 60 may use it. Similarly, if all the pointers 68(1)-68(16) in a given reference 60(x) are null, or if they all point to sub-page state indicators that are marked I, then that reference 60(x) is no longer in active use, and a pointer to that reference 60(x) may be stored in the free list 76, so that it may be used for future storage operations.

Maximum token count value 84 stores the current number of SPs 40 in operation at the current time. The value of the token count 64 of any reference 60(x) and its counterpart references 60(x) on all other SPs 40 (together with any token counts stored in messages 80, 82 en route between SPs 40) should never exceed the current maximum token count value 84.

Having described the various systems, apparatuses, and associated constructs of and used in conjunction with various embodiments, this Description will now turn to describing various method embodiments which may be performed in conjunction with the above-described systems, apparatuses, and associated constructs.

Figure 3:
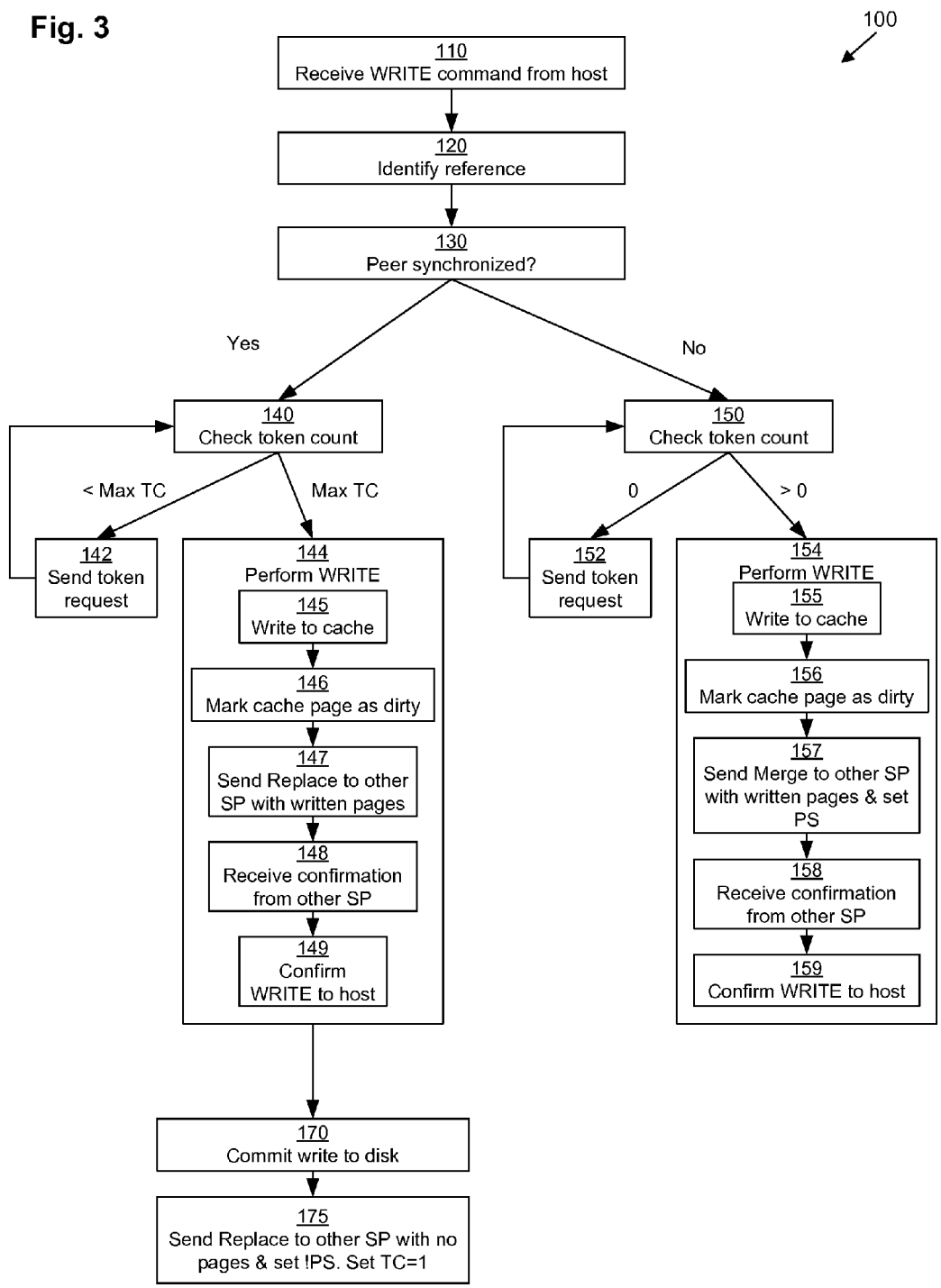
FIG. 3 illustrates an example method according to various embodiments.

FIG. 3 depicts an example method 100 performed by controller 52(1) of a first SP 40(1). In step 110, first SP 40(1) receives a write command sent by a host 32 across storage network 34 to a storage bus port 44(1)(a) or 44(1)(b) of SP 40(1). The write command includes a start address (e.g., a LUN and BN) of storage where it should be written as well as the data to be written at that address. The write command may also include a size, indicating how many blocks it covers. Typically, write commands will cover between one and eight blocks (inclusive).

In step 120, controller 52(1) identifies a particular reference 60(x) whose tag 62 is uniquely associated with the LUN and BN of the write command by using hash table 58. Hash table 58 returns a pointer to a linked list of references 60 with the appropriate hash. In some cases, a reference 60(x) having the appropriate tag 62 already exists within the reference portion 50(1), in which case controller 52(1) is able to traverse the linked list and find the appropriate reference 60(x).

However, if the particular reference 60(x) does not exist yet, then controller 52(1) will not find it in the linked list, so controller 52(1) creates a new reference 60(x) using free space in the reference portion 50(1) indicated by the free list 76, removes a pointer to reference 60(x) from the free list, and adds the new reference 60(x) to an appropriate linked list pointed to by the hash table 58. Controller 52(1) also initializes the reference 60(x) by setting the tag 62 and pointers 68 to values based on the LUN and BN (and, in the case of pointers 68, the size) of the write operation, by setting the token count 64 to a value of 1, and by setting the peer synchronization flag 66 to FALSE.

In step 130, controller 52(1) checks to see if the reference 60(x) is in a peer synchronized state. This may be done by checking the value of the peer synchronization flag 66. If TRUE, then operation proceeds with step 140. If FALSE, then operation proceeds with step 150. SP 40(1) should be peer synchronized with respect to a reference 60(x) when at least one other SP 40 contains a copy of the same reference 60(x) with up-to-date associated cache pages 74. While peer synchronized, any write operations done to data blocks managed by the reference 60(x) are mirrored to at least one other SP 40.

In step 140, when the first SP 40(1) is peer synchronized with at least one other SP 40 with respect to reference 60(x), controller 52(1) checks the token count 64 of the reference 60(x) to see if it is equal to or less than a maximum token count value (Max TC) 84. If less, operation proceeds with step 142. If equal to the Max TC 84, operation proceeds with step 144. While peer synchronized with respect to a reference 60(x), an SP 40(1) can only perform a write if its token count 64 is equal to Max TC 84. Otherwise, SP 40(1) must first attempt to acquire the appropriate number of tokens.

In step 142, controller 52(1) sends a token request message to another SP 40. If there are only two SPs, this is done by creating a sent message 80, storing a token credit value 86 of zero and a token request value 88 of one or two (depending how many tokens are needed) in the message, and sending the message 80 over the cache mirroring interface 54(1) to the other SP 40(2), where it will be received as a received message 82. Upon receiving received message 82 with a token credit value 86 of zero and a token request value 88 of one or two, second SP(2) will, as long as reference 60(x) is not currently being operated upon on SP 40(2), send a token response message 80 having a token credit value 86 of one or two (as requested and as available) and a token request value 88 of zero back to the first SP 40(1) over cache mirroring bus 42, where first SP 40(1) receives it as a received message 82. Upon receiving the token response received message 82, controller 52(1) may transfer the tokens credited to the reference 60(x) by incrementing token count value 64 by the number of received tokens. Operation then proceeds with step 140 again to confirm that the token count 64 is sufficient to perform the write operation. Embodiments in which there are more than two SPs 40 will be discussed below in further detail, in connection with FIG. 5.

In step 144, since the first SP 40(1) has the maximum number of tokens with respect to reference 60(x), controller 52(1) performs the write operation. This step may be accomplished via several sub-steps.

In sub-step 145, controller 52(1) performs a cache write operation, writing the data from the write operation into the appropriate sub-pages D1-D8 of the cache page 74(y) pointed to by the pointers 68 of reference 60(x). It should be understood that during sub-step 145, if a cache page 74 pointed to by pointers 68 is already allocated with a state map 72 that is not fully V or I, the write cache operation may include allocating a new cache page 74 and temporarily marking various sub-page state indicators S1-S8 as D or P, as described above. In sub-step 146, controller 52(1) marks the corresponding sub-page state indicators S1-S8 of state map 72(y) as D for the sub-pages D1-D8 that were written to in sub-step 145, since they are now more recent than the corresponding data blocks in storage 38.

In sub-step 147, controller 52(1) sends a Replace message to the other SP 40(2) together with the data from the sub-pages D1-D8 that were written to in sub-step 145. This may be done by using a sent message 80 formatted with a Replace command and a token credit value 86 of zero and a token request value 88 of zero and the data to be written, and sending the sent message 80 across the cache mirroring interface 54(1) to the other SP 40(2). The second SP 40(2) then receives the Replace message as a received message 82 and updates the appropriate corresponding local reference 60(x) and cache page 74(y) prior to sending back a confirmation message 80. In some embodiments, the second SP 40(2) first stores the received sub-pages D1-D8 in a new cache page 74(z) with a state map 72(z) having D marks, then marks state map 72(y) with P marks, and then copies the data from cache page 74(z) to cache page 74(y) before marking state map 72(y) with D marks as needed.

In sub-step 148, the first SP 40(1) receives the confirmation message 82 over the cache mirroring interface 54(1) from the other SP 40(2), and in sub-step 149, controller 52(1) sends a confirmation signal to the host 32 indicating that the write operation has been successfully completed.

At this point, cache page 74(y) (as well as corresponding cache page 74(y) on the second SP 40(2)) includes dirty data written to the addressed LUN and BN of storage 38. If a read operation for that same LUN and BN is received by first SP 40(1), first SP 40(1) is able to easily respond by reading cache page 74(y) without needing to go to storage 38 (see FIG. 4 for details of performing read operations). At some point, if cache page portion 48(1) gets full and the cache page 74(y) has not been read or written to recently, or if the first SP 40(1) is not busy and has free cycles to dedicate to writing to storage 38, it may be desirable to commit the dirty data in cache page 74(y) to storage 38. Thus, in step 170, controller 52(1) commits the dirty data in cache page 74(y) to storage 38, allowing the state map 72(y) to be set to V values. In step 175, controller 52(1) sends a Replace message to the other SP 40(2) with no cache page data, indicating that the other SP 40(2) no longer needs to mirror the data in cache page 74(y), since it has been committed to storage 38. This may be done by using a sent message 80 formatted with a Replace command and a token credit value 86 of one and a token request value 88 of zero and a peer de-synchronization command, and sending the sent message 80 across the cache mirroring interface 54(1) to the other SP 40(2). The second SP 40(2) then receives the Replace message as a received message 82 and frees the appropriate corresponding cache page 74(y) onto its free list 76 prior to sending back a confirmation message 80. The second SP 40(2) also marks the peer synchronization flag 66 of its corresponding local reference 60(x) as FALSE and sets its token count 64 to one. In some embodiments, the second SP 40(2) may even free the corresponding local reference 60(x) onto the free list 76. The first SP 40(1) also marks the peer synchronization flag 66 of its reference 60(x) as FALSE and sets its token count 64 to one. In some embodiments, the first SP 40(1) may even free reference 60(x) onto the free list 76, if the space is needed. This is because any time a reference 60 with an appropriate tag 62 is not found, it is automatically created with an initial token count 64 of one in a non-peer-synchronized state.

In step 150, when the first SP 40(1) is not peer synchronized with at least one other SP 40 with respect to reference 60(x), controller 52(1) checks the token count 64 of the reference 60(x) to see if it is greaten than zero. If zero, operation proceeds with step 152. If non-zero (it can legally only be a non-negative integer), operation proceeds with step 154. While non-peer-synchronized with respect to a reference 60(x), an SP 40(1) can only perform a write if its token count 64 is greater than zero. Otherwise, SP 40(1) must first attempt to acquire a token. In some embodiments, the maximum number of tokens must be acquired even when not peer synchronized before proceeding to step 154.

In step 152, controller 52(1) sends a token request message to another SP 40. If there are only two SPs, this is done by creating a sent message 80, storing a token credit value 86 of zero and a token request value 88 of one in the message, and sending the message 80 over the cache mirroring interface 54(1) to the other SP 40(2), where it will be received as a received message 82. Upon receiving received message 82 with a token credit value 86 of zero and a token request value 88 of one, second SP 40(2) will, as long as reference 60(x) is not currently being operated upon on SP 40(2), send a token response message 80 having a token credit value 86 of one and a token request value 88 of zero back to the first SP 40(1) over cache mirroring bus 42, where first SP 40(1) receives it as a received message 82. Upon receiving the token response message 82, controller 52(1) may transfer the token credited to the reference 60(x) by incrementing token count value 64 by one. Operation may then proceed with step 150 again to confirm that the token count 64 is sufficient to perform the write operation. Embodiments in which there are more than two SPs 40 will be discussed below in further detail, in connection with FIG. 5.

In step 154, since the first SP 40(1) has at least one token with respect to reference 60(x), controller 52(1) performs the write operation. This step may be accomplished via several sub-steps.

In sub-step 155, controller 52(1) performs a cache write operation, writing the data from the write operation into the appropriate sub-pages D1-D8 of the cache page 74(y) pointed to by the pointers 68 of reference 60(x). It should be understood that during sub-step 155, if a cache page 74 pointed to by pointers 68 is already allocated with a state map 72 that is not fully V or I, the write cache operation may include allocating a new cache page 74 and temporarily marking various sub-page state indicators S1-S8 as D or P, as described above.

In sub-step 156, controller 52(1) marks the corresponding sub-page state indicators S1-S8 of state map 72(y) as D for the sub-pages D1-D8 that were written to in sub-step 155, since they are now more recent than the corresponding data blocks in storage 38.

In sub-step 157, controller 52(1) sends a Merge message to the other SP 40(2) together with the state map 72(y) and data from the sub-pages D1-D8 that were written to in sub-step 155. This may be done by using a sent message 80 formatted with a Merge command and a token credit value 86 of zero and a token request value 88 of zero and the state map 72(y) and data to be written and a peer synchronization command, and sending the sent message 80 across the cache mirroring interface 54(1) to the other SP 40(2). The second SP 40(2) then receives the Merge message as a received message 82 and updates the appropriate corresponding local reference 60(x) and cache page 74(y) prior to sending back a confirmation message 80. In some embodiments, the second SP 40(2) first stores the received sub-pages D1-D8 in a new cache page 74(z) with a state map 72(z) having D marks, then marks state map 72(y) with P marks, and then copies the data from cache page 74(z) to cache page 74(y) before marking state map 72(y) with D marks as needed.

It may happen that two SPs 40, e.g., first SP 40(1) and second SP 40(2) both process conflicting write commands for the same LUN and BN at the same time. If that happens, it is possible for Merge messages from the two SPs 40(1), 40(2) to cross in transit. Thus, if first SP 40(1) receives a Merge message for a given reference 60(x) while it is still awaiting a Merge response from the second SP 40(2) (which means that second SP 40(2) will also receive a Merge message for the reference 60(x) while it is still awaiting a Merge response from the first SP 40(1)), then each SP 40(1), 40(2) must deal with the situation in the same way in order to preserve the mirror. Typically, the controller 52 of each SP 40 will examine the new and old state maps 72(z), 72(y) and for any sub-page state indicator S1-S8 that is marked D in only one of the state maps 72(z), 72(y), the sub-page marked D will prevail. If any of the sub-page state indicator S1-S8 are marked D in both the new and old state maps 72(z), 72(y), then a tie breaking operation is used to select which version to use in a predictable way (so that both SPs 40(1), 40(2) can be sure to yield the same result). For example, one tie breaking operation that could be used would be to use the version from whichever SP 40(1), 40(2) has been operating longer. Another example tie breaking operation that could be used would be to use the version from whichever write command was issued by a host 32 last.

In sub-step 158, the first SP 40(1) receives the confirmation message 82 over the cache mirroring interface 54(1) from the other SP 40(2), and in sub-step 149, controller 52(1) sends a confirmation signal to the host 32 indicating that the write operation has been successfully completed.

At this point, cache page 74(y) (as well as corresponding cache page 74(y) on the second SP 40(2)) includes dirty data written to the addressed LUN and BN of storage 38. If a read operation for that same LUN and BN is received, by either SP 40(1), 40(2), either SP 40(1), 40(2) is able to easily respond by reading cache page 74(y) without needing to go to storage 38 (see FIG. 4 for details of performing read operations). At some point, if cache page portion 48(1) gets full and the cache page 74(y) has not been read or written to recently, it may be desirable to commit the dirty data in cache page 74(y) to storage 38, as in steps 170-175, however, this is only done by an SP 40 if that SP 40 has the Max TC 84 token count 64 and it is in a peer-synchronized state.

Figure 4:
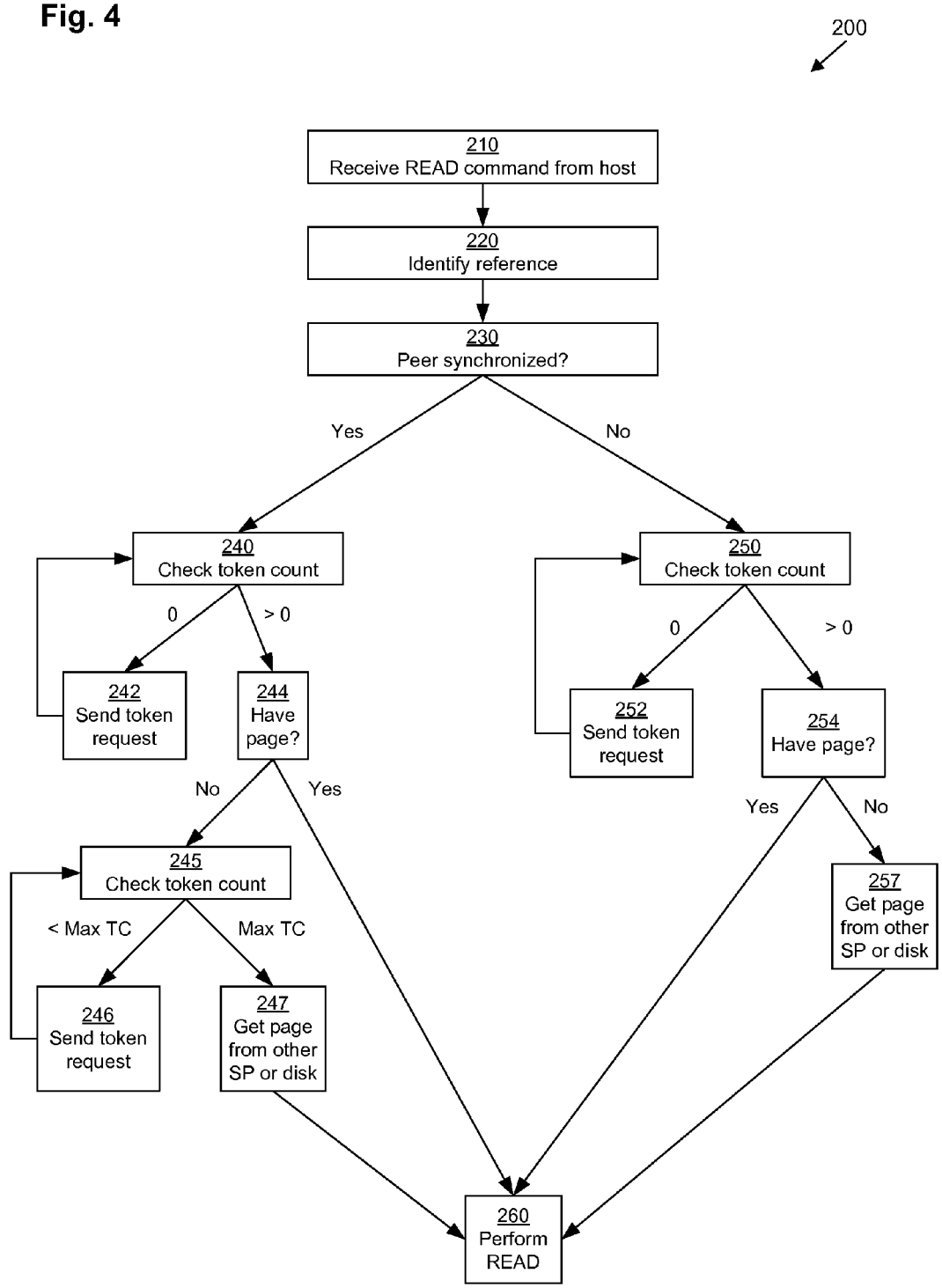
FIG. 4 illustrates an example method according to various embodiments.

FIG. 4 depicts an example method 200 performed by controller 52(1) of a first SP 40(1). In step 210, first SP 40(1) receives a read command sent by a host 32 across storage network 34 to a storage bus port 44(1)(a) or 44(1)(b) of SP 40(1). The read command includes a start address (e.g., a LUN and BN) of storage from where it should be read. The read command may also include a size, indicating how many blocks it covers. Typically, read commands will cover between one and eight blocks (inclusive).

In step 220, controller 52(1) identifies a particular reference 60(x) whose tag 62 is uniquely associated with the LUN and BN of the read command by using hash table 58, as described above.

In step 230, controller 52(1) checks to see if the reference 60(x) is in a peer synchronized state. This may be done by checking the value of the peer synchronization flag 66. If TRUE, then operation proceeds with step 240. If FALSE, then operation proceeds with step 250. Recall that SP 40(1) should be peer synchronized with respect to a reference 60(x) when at least one other SP 40 contains a copy of the same reference 60(x) with up-to-date associated cache pages 74.

In step 240, when the first SP 40(1) is peer synchronized with at least one other SP 40 with respect to reference 60(x), controller 52(1) checks the token count 64 of the reference 60(x) to see if it is greater than or equal to zero. If zero, operation proceeds with step 242. If greater than zero, operation proceeds with step 244. While peer synchronized with respect to a reference 60(x), an SP 40(1) can only perform a read if its token count 64 is at least one and it has the data stored in a cache page 74. Otherwise, SP 40(1) must first attempt to acquire the appropriate number of tokens.

In step 242, controller 52(1) sends a token request message to another SP 40. If there are only two SPs, this is done by creating a sent message 80, storing a token credit value 86 of zero and a token request value 88 of one in the message, and sending the message 80 over the cache mirroring interface 54(1) to the other SP 40(2), where it will be received as a received message 82. Upon receiving received message 82 with a token credit value 86 of zero and a token request value 88 of one, second SP(2) will, as long as reference 60(x) is not currently being operated upon on SP 40(2), send a token response message 80 having a token credit value 86 of one and a token request value 88 of zero back to the first SP 40(1) over cache mirroring bus 42, where first SP 40(1) receives it as a received message 82. Upon receiving the token response message 82, controller 52(1) may transfer the tokens credited to the reference 60(x) by incrementing token count value 64. Operation may then proceed with step 240 again to confirm that the token count 64 is sufficient to perform the read operation. Embodiments in which there are more than two SPs 40 will be discussed below in further detail, in connection with FIG. 5.

In step 244, controller 52(1) checks to see if the appropriate pointers 68 of the reference 60(x) all point to Valid or Dirty sub-pages 74. If so, the read can be performed, and operation proceeds to step 260. If not, the data needs to be loaded into a cache page 74. However, when peer synchronized, this is only permitted if the token count 64 is the Max TC 84. So, If the data is not available, operation proceeds to step 245.

In step 245, controller 52(1) checks the token count 64 of the reference 60(x) to see if it is equal to or less than the Max TC 84. If less, operation proceeds with step 246. If equal to the Max TC 84, operation proceeds with step 247.

In step 246, controller 52(1) sends a token request message to another SP 40. If there are only two SPs, this is done by creating a sent message 80, storing a token credit value 86 of zero and a token request value 88 of as many tokens as needed (e.g., 1, 2, etc.) in the message, and sending the message 80 over the cache mirroring interface 54(1) to the other SP 40(2), where it will be received as a received message 82. Upon receiving received message 82 with a token credit value 86 of zero and a token request value 88 of the desired number, second SP(2) will, as long as reference 60(x) is not currently being operated upon on SP 40(2), send a token response message 80 having a token credit value 86 of all of its tokens and a token request value 88 of zero back to the first SP 40(1) over cache mirroring bus 42, where first SP 40(1) receives it as a received message 82. Upon receiving the token response message 82, controller 52(1) may transfer the tokens credited to the reference 60(x) by incrementing token count value 64. Operation may then proceed with step 246 again to confirm that the token count 64 is sufficient to perform the read operation. Embodiments in which there are more than two SPs 40 will be discussed below in further detail, in connection with FIG. 5.

In step 247, once SP 40(1) has acquired Max TC 84 number of tokens, controller 52(1) may either send a data request message to the other SP 40(2) (if that SP 40(2) stores the relevant cache pages) or it may send a read request to storage 38 to fetch the data as committed. Once that is done, operation proceeds to step 260, in which the read operation is performed.

In step 260, since the first SP 40(1) has at an appropriate number of tokens with respect to reference 60(x) as well as the necessary data in a cache page 74, controller 52(1) performs the read operation.

In step 250, when the first SP 40(1) is not peer synchronized with at least one other SP 40 with respect to reference 60(x), controller 52(1) checks the token count 64 of the reference 60(x) to see if it is zero or greater than zero. If zero, operation proceeds with step 252. If greater than zero, operation proceeds with step 254. While non-peer-synchronized with respect to a reference 60(x), an SP 40(1) can only perform a read if its token count 64 is greater than zero and it has the appropriate data stored in cache portion 48(1). Otherwise, SP 40(1) must first attempt to acquire a token and/or data.

In step 252, controller 52(1) sends a token request message to another SP 40. If there are only two SPs, this is done by creating a sent message 80, storing a token credit value 86 of zero and a token request value 88 of one in the message, and sending the message 80 over the cache mirroring interface 54(1) to the other SP 40(2), where it will be received as a received message 82. Upon receiving received message 82 with a token credit value 86 of zero and a token request value 88 of one, second SP 40(2) will, as long as reference 60(x) is not currently being operated upon on SP 40(2), send a token response message 80 having a token credit value 86 of one and a token request value 88 of zero back to the first SP 40(1) over cache mirroring bus 42, where first SP 40(1) receives it as a received message 82. Upon receiving the token response message 82, controller 52(1) may transfer the token credited to the reference 60(x) by incrementing token count value 64 by one. Operation may then proceed with step 250 again to confirm that the token count 64 is sufficient to perform the read operation. Embodiments in which there are more than two SPs 40 will be discussed below in further detail, in connection with FIG. 5.

In step 254, since the first SP 40(1) has at least one token with respect to reference 60(x), controller 52(1) can perform the read operation, however, it is possible that the desired data is not stored in any of the cache pages 74. Thus, in step 254, controller 52(1) checks to see if pointers 68 of reference 60(x) point to an actual cache page 74(y) that has Valid or Dirty data stored in all of the relevant sub-pages. If so, operation proceeds to step 260, in which the read operation is performed. If, however, pointers 68 of reference 60(x) do not point to any cache page 74 at all, or if the cache page that they point to contains Invalid data, then operation proceeds to step 257. In step 257, controller 52(1) may either send a data request message to the other SP 40(2) (if that SP 40(2) stores the relevant cache pages) or it may send a read request to storage 38 to fetch the data as committed. Once that is done, operation proceeds to step 260, in which the read operation is performed.

Figure 5:
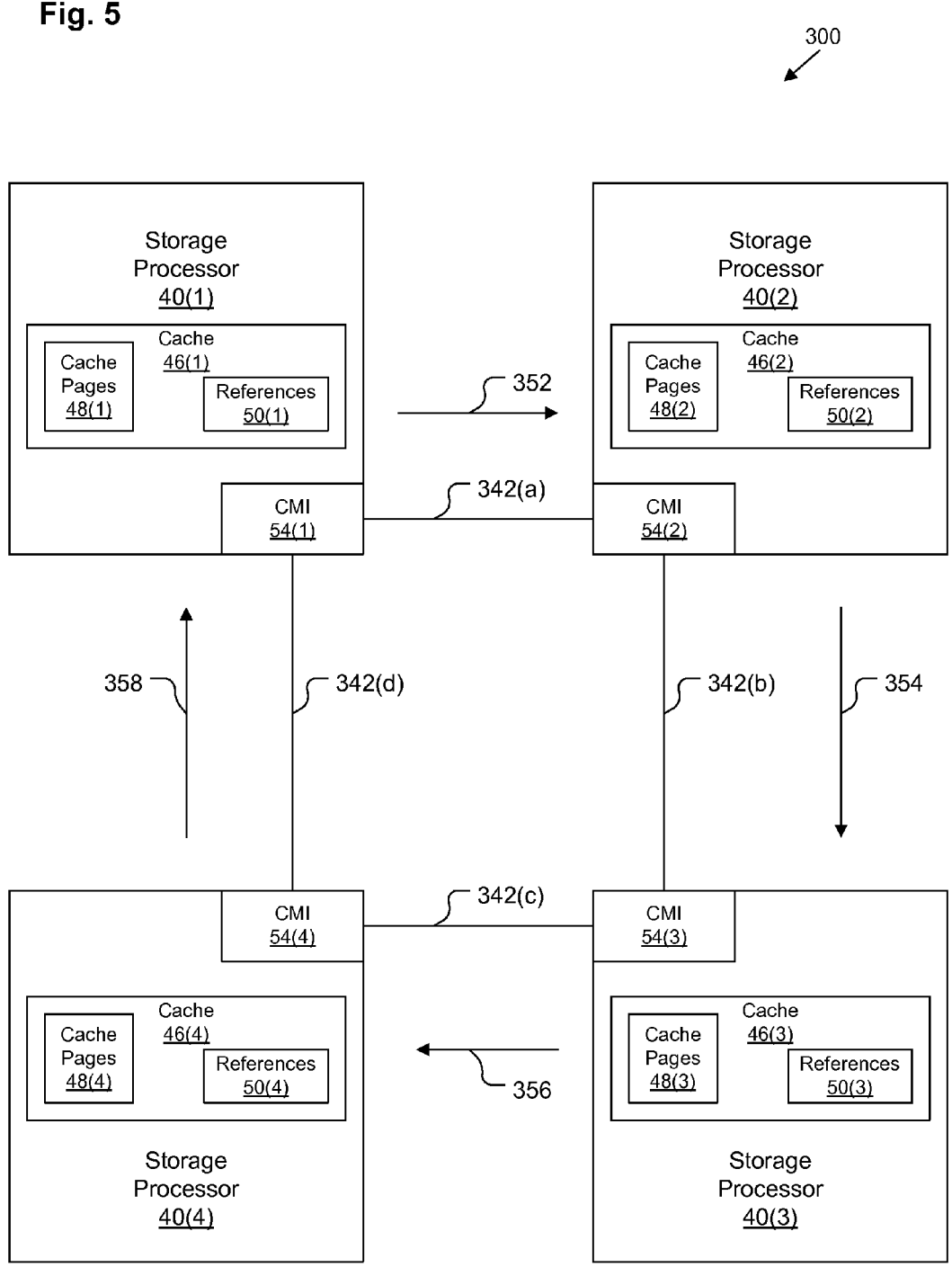
FIG. 5 illustrates an example system for use in practicing various embodiments.

FIG. 5 depicts an example configuration 300 according to an embodiment in which four SPs 40 are present within data storage array 36. In the example configuration 300, the SPs 40 are communicatively connected to each other in a ring configuration over a set of cache mirroring buses 342(a), 342(b), 342(c), and 342(d). Each cache mirroring interface 54 connects to two neighboring SPs over two neighboring cache mirroring buses 342, and messages 80, 82 are sent between the SPs using a ring scheme.

For example, in step 142 of method 100 (see FIG. 3), if first SP 40(1) starts out with zero tokens, it may send a token request message 352 storing a token credit value 86 of zero and a token request value 88 of four (since, in the example of FIG. 5, Max TC is equal to four) across bus 342(a) to second SP 40(2). If, for example, second SP 40(2) has one token, it may modify message 352 to instead store a token credit value 86 of one and a token request value 88 of three and then send token request message 354 across bus 342(b) to third SP 40(3). If, for example, third SP 40(3) has no token, it may leave message 354 unmodified and send it as token request message 356 across bus 342(b) to fourth SP 40(4). If, for example, fourth SP 40(4) has three tokens, it may modify message 356 to instead store a token credit value 86 of four and a token request value 88 of zero and then send token request message 358 across bus 342(d) back to first SP 40(1). A similar approach may be taken with respect to steps 152, 242, and 252.

In configuration 300, in some embodiments, data storage operations may be cached on all four SPs 40, while, in other embodiments, data storage operations are only cached on up to two of the SPs 40 at once.

Thus, techniques have been described for configuring mirrored caching storage processors 40 in an active/active configuration using tokens associated with reference structures 60.

While various embodiments of the present disclosure have been particularly shown and described, it will be understood by those skilled in the art that various changes in form and details may be made therein without departing from the spirit and scope of the present disclosure as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed at a first storage processing device (SP), the first SP having a first cache, the first SP being communicatively connected to a second SP having a second cache over a cache mirroring bus, the first cache and the second cache being configured to function as mirrors, the first SP and the second SP being configured to operate in an active/active fashion for processing data storage commands directed at a data storage array, wherein the method comprises:
   receiving a write command at the first SP from a host computer directed to a particular address of the data storage array;
   identifying a reference structure in the first cache that is uniquely associated with the particular address, the reference structure pointing to a set of cache pages associated with the particular address, the reference structure having a token count field;
   determining whether the reference structure is synchronized with a corresponding reference structure in the second cache;
   if the reference structure is synchronized with the corresponding reference structure, then:
     performing a cache write operation on a cache page of the set of cache pages pointed to by the reference structure if the reference structure stores a maximum token count value; and
     otherwise, sending a token request message from the first SP to the second SP over the cache mirroring bus to request a token from the second SP prior to performing the cache write operation;
   if the reference structure is not synchronized with the corresponding reference structure, then:
     performing the cache write operation if the reference structure stores a token count value of least one; and
     otherwise, sending a token request message from the first SP to the second SP over the cache mirroring bus to request a token from the second SP prior to performing the cache write operation; and
   in response to performing the cache write operation, synchronizing the reference structure with the corresponding reference structure by sending a merge message from the first SP to the second SP over the cache mirroring bus, the merge message including the cache page on which the cache write operation was performed to be copied to the second cache.

2. The method of claim 1 wherein the method further comprises:
   receiving another merge message from the second SP over the cache mirroring bus including the same cache page with different data;
   performing a tie breaking operation to decide which of the first SP and the second SP has priority for operations directed at the particular address;
   if the tie breaking operation indicates the second SP, then copying the received cache page into the cache; and
   if the tie breaking operation indicates the first SP, then refraining from copying the received cache page into the cache.

3. The method of claim 1 wherein identifying the reference structure in the first cache that is uniquely associated with the particular address includes generating a new reference structure having a token count value equal to one, the new reference structure pointing to a null set of cache pages associated with the particular address.

4. The method of claim 1 wherein identifying the reference structure in the first cache that is uniquely associated with the particular address includes looking up the particular address in a hash table, the hash table pointing to a linked list of reference structures, the identified reference structure being within the linked list of reference structures.

5. The method of claim 1 wherein the maximum token count value is equal to two.

6. The method of claim 1 wherein:
   there are N SPs configured to operate in an active/active fashion for processing data storage commands directed at the data storage array, the N SPs being communicatively connected to each other over the cache mirroring bus, N being an integer larger than two;
   the maximum token count value is equal to N; and
   sending the token request message from the first SP to the second SP over the cache mirroring bus to request a token from the second SP prior to performing the cache write operation further includes sending an additional token request message from the first SP to one of the SPs other than the first SP and the second SP if the token request message sent to the second SP does not result in the token count value equaling the maximum token count value.

7. The method of claim 6 wherein sending the additional token request message includes sending the additional token request message from the first SP to the second SP to be forwarded to the other SPs in a ring configuration.

8. The method of claim 1 wherein performing the cache write operation on the cache page of the set of cache pages pointed to by the reference structure includes:
   writing data from the write operation into the cache page;
   marking the cache page as containing dirty data;
   sending a replace message from the first SP to the second SP over the cache mirroring bus, the replace message including the cache page on which the cache write operation was performed to be copied to the second cache;
   in response to sending the replace page, receiving a confirmation message from the second SP indicating that the cache write operation has been mirrored into the second cache; and
   in response to receiving the confirmation message, sending a confirmation signal to the host computer indicating that the write command has been performed.

9. The method of claim 1 wherein sending the token request message from the first SP to the second SP over the cache mirroring bus to request the token from the second SP prior to performing the cache write operation includes:
   sending the token request message, the token request message including a credit of zero tokens and a request for the maximum token count value minus the value of the token count field;
   in response to sending the token request message, receiving a token response message at the first SP from the second SP over the cache mirroring bus, the token response message including a credit of X tokens and a request for zero tokens;
   in response to receiving the token response message, incrementing the token count value of the reference structure in the first cache by X;

in response to incrementing the token count value, if the reference structure stores the maximum token count value, then performing the cache write operation on the cache page of the set of cache pages pointed to by the reference structure;

otherwise, refraining from performing the cache write operation on the cache page of the set of cache pages pointed to by the reference structure.

10. An apparatus comprising the first SP of claim 1, wherein the first SP includes:
    a network interface port connected to the host over a storage network;
    memory, the memory storing the first cache;
    an interprocessor bus interface for communicating with the second SP over the cache mirroring bus; and
    a controller, the controller being configured to perform the method of claim 1.

11. A method performed at a first storage processing device (SP), the first SP having a first cache, the first SP being communicatively connected to a second SP having a second cache over a cache mirroring bus, the first cache and the second cache being configured to function as mirrors, the first SP and the second SP being configured to operate in an active/active fashion for processing data storage commands directed at a data storage array, wherein the method comprises:
    receiving a write command at the first SP from a host computer directed to a particular address of the data storage array;
    identifying a reference structure in the first cache that is uniquely associated with the particular address, the reference structure pointing to a set of cache pages associated with the particular address, the reference structure having a token count field;
    determining whether the reference structure is synchronized with a corresponding reference structure in the second cache; and
    if the reference structure is synchronized with the corresponding reference structure, then:
        performing a cache write operation on a cache page of the set of cache pages pointed to by the reference structure if the reference structure stores a maximum token count value; and
        otherwise, sending a token request message from the first SP to the second SP over the cache mirroring bus to request a token from the second SP prior to performing the cache write operation;
    wherein performing the cache write operation on the cache page of the set of cache pages pointed to by the reference structure includes:
        writing data from the write operation into the cache page;
        marking the cache page as containing dirty data;
        sending a replace message from the first SP to the second SP over the cache mirroring bus, the replace message including the cache page on which the cache write operation was performed to be copied to the second cache;
        in response to sending the replace page, receiving a confirmation message from the second SP indicating that the cache write operation has been mirrored into the second cache; and
        in response to receiving the confirmation message, sending a confirmation signal to the host computer indicating that the write command has been performed;
    wherein the method further comprises:
        writing data from the cache page marked as dirty to the particular address of the data storage array;
        sending a replace message from the first SP to the second SP over the cache mirroring bus, the replace message including a null cache page pointer and an instruction for the corresponding reference structure to enter a non-synchronized state;
        setting the reference structure in the first cache into a non-synchronized state; and
        setting the token count value of the reference structure in the first cache to be equal to one.

12. An apparatus comprising the first SP of claim 11, wherein the first SP includes:
    a network interface port connected to the host over a storage network;
    memory, the memory storing the first cache;
    an interprocessor bus interface for communicating with the second SP over the cache mirroring bus; and
    a controller, the controller being configured to perform the method of claim 11.

13. A method performed at a first storage processing device (SP), the first SP having a first cache, the first SP being communicatively connected to a second SP having a second cache over a cache mirroring bus, the first cache and the second cache being configured to function as mirrors, the first SP and the second SP being configured to operate in an active/active fashion for processing data storage commands directed at a data storage array, wherein the method comprises:
    receiving a read command at the first SP from a host computer directed to a particular address of the data storage array;
    identifying a reference structure in the first cache that is uniquely associated with the particular address, the reference structure pointing to a set of cache pages associated with the particular address, the reference structure having a token count field;
    determining whether the reference structure is synchronized with a corresponding reference structure in the second cache;
    if the reference structure is synchronized with the corresponding reference structure, then:
        performing a cache read operation on a cache page of the set of cache pages pointed to by the reference structure if the reference structure stores a token count value of at least one and the cache page contains data to be read; and
        otherwise, sending a token request message from the first SP to the second SP over the cache mirroring bus to request a token from the second SP prior to performing the cache read operation; and
    if the reference structure is not synchronized with the corresponding reference structure, then:
        performing the cache read operation if the reference structure stores a token count value greater than zero and the set of cache pages is not null;
        otherwise, if the reference structure stores a token count value greater than zero and the set of cache pages is null, performing the cache read operation after sending a mirroring request message from the first SP to the second SP over the cache mirroring bus to request the cache page from the second SP; and
        otherwise, sending a token request message from the first SP to the second SP over the cache mirroring bus to request a token from the second SP prior to performing the cache read operation.

14. The method of claim 13 wherein identifying the reference structure in the first cache that is uniquely associated with the particular address includes generating a new reference structure having a token count value equal to one, the new reference structure pointing to a null set of cache pages associated with the particular address.

15. The method of claim 13 wherein the maximum token count value is equal to two.

16. The method of claim 13 wherein identifying the reference structure in the first cache that is uniquely associated with the particular address includes looking up the particular address in a hash table, the hash table pointing to a linked list of reference structures, the identified reference structure being within the linked list of reference structures.

17. An apparatus comprising the first SP of claim 13, wherein the first SP includes:
- a network interface port connected to the host over a storage network;
- memory, the memory storing the first cache;
- an interprocessor bus interface for communicating with the second SP over the cache mirroring bus; and
- a controller, the controller being configured to perform the method of claim 13.

* * * * *